Figure 3:
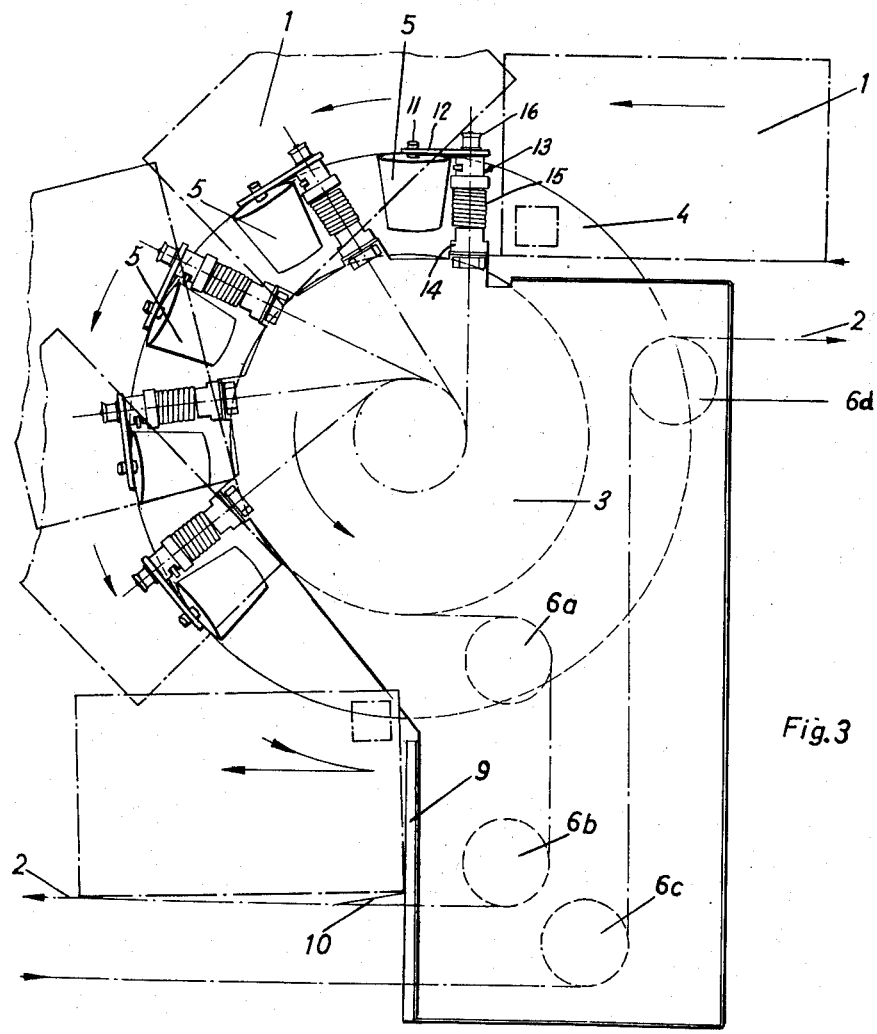

March 12, 1963    H. SALZMANN    3,080,956
ARRANGEMENT FOR LEADING FLAT DISPATCH ARTICLES
ROUND CORNERS IN CONVEYING SYSTEMS
Filed May 23, 1960    2 Sheets-Sheet 1
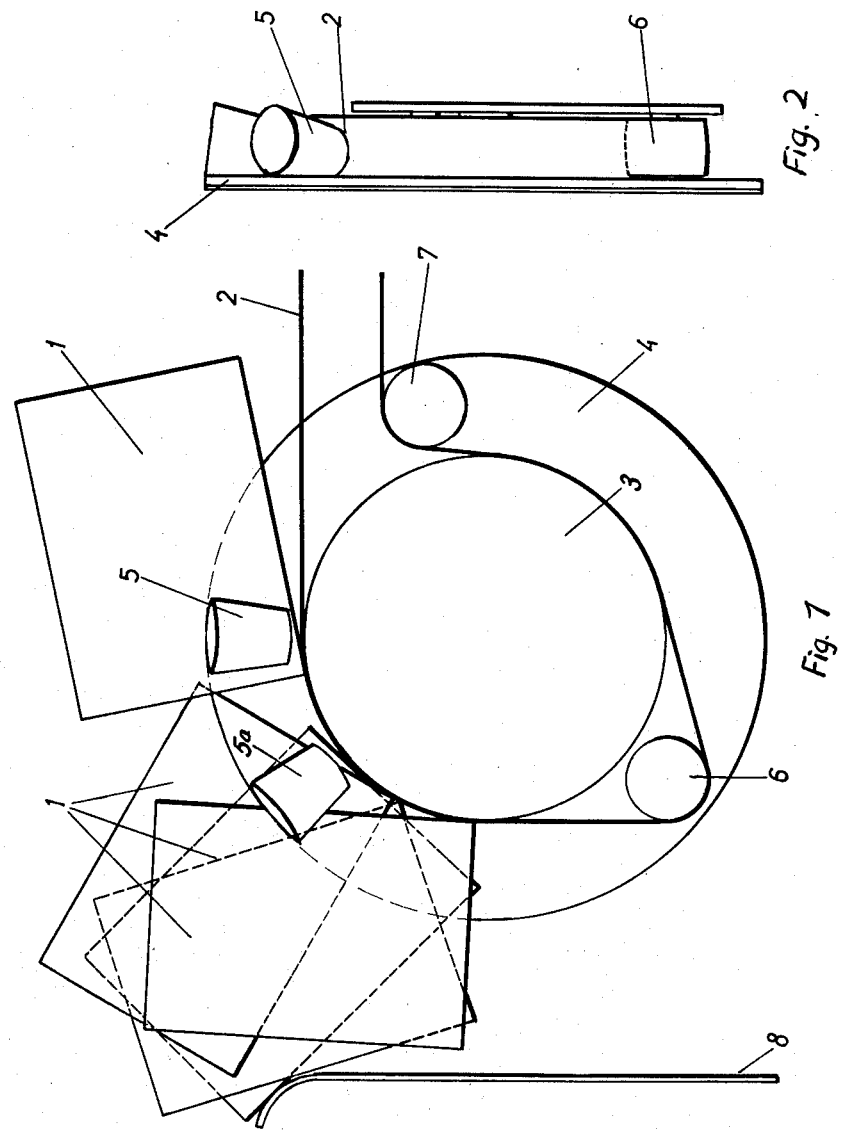
INVENTOR
HELMUT SALZMANN
BY
Agent

INVENTOR
HELMUT SALZMANN
BY

United States Patent Office 3,080,956
Patented Mar. 12, 1963

3,080,956
ARRANGEMENT FOR LEADING FLAT DISPATCH ARTICLES ROUND CORNERS IN CONVEYING SYSTEMS
Helmut Salzmann, Berlin, Germany, assignor to International Standard Electric Corporation, New York, N.Y., a corporation of Delaware
Filed May 23, 1960, Ser. No. 31,104
Claims priority, application Germany June 25, 1959
15 Claims. (Cl. 198—33)

This invention relates to conveying systems and more particularly to systems for changing the direction of the articles conveyed.

In arrangements for conveying flat dispatch articles it is often the case that the conveying direction has to be changed. This presents no difficulties if the changeover from the one into the other direciton is carried out gradually via a bend, or if the successively following conveying paths form an obtuse angle of about 180°. If the redirecting angle is a right angle or an acute angle, then the redirection of the dispatch articles is rendered more difficult. The changes of direction can be carried out in one plane, as well as from one plane into another one. This problem is of more importance in conveying systems in which the conveying path has to be redirected from a horizontal or almost horizontal direction into a practically vertical direction.

Up to now this problem has been solved with respect to flat dispatch articles in that the articles were conveyed by being pressed between two belts, whereby these belts were guided via rollers into the corresponding direction. It is further known to use disks or rollers on which the articles are conveyed from the one direction into the other one by travelling edgewise or lying in a conveyor chute, in particular in systems in which the conveyance is effected only in one single plane. Such types of arrangements used in post office operations where the individual mail items are of different dimensions and weight, however, do not operate with a sufficient reliability. The individual mail items are conveyed differently round the corner by the centrifugal force and thereby their position with respect to the conveyor belt is changed.

The invention relates to an arrangement for conveying flat dispatch articles, particularly letters or similar mail items, round a corner in conveying systems. Above all the invention relates to the practical application to conveying systems in which the articles are conveyed by travelling edgewise in a conveyor chute which is seated on a belt. The disadvantages of the conventional arrangement are avoided by this invention. According to the invention this is accomplished in that the delivering conveyor belt at the reversing point is led over a roller which has a relatively large diameter, and is unilaterally provided with a flange against which, at the reversing section, two or more freely running conical rollers are pressed resiliently.

The articles conveyed on the conveyor belt lie at the turning point between the flange of the rollers, the height of which respectively of the flange amounts to about one quarter of the medium height of the dispatch articles, and in this way it is moved securely in a circular arc which is performed by the belt on the roller.

According to a further feature of the invention the conveyor belt after having been led round the roller with the large diameter by 180°, is led round one or two guide rollers with a smaller diameter which it leaves again in that direction in which it meets upon the larger roller. Accordingly, the conveyance is continuously performed in one direction, but in two different planes. The conical rollers adapted to press the dispatch articles against the flange of the large roller, are distributed by about 130° along the periphery of the large roller. In such an arrangement the dispatch articles are led to the reversing point by the aforementioned small reversion rollers, and then they change over to the conveyor belt by which they are delivered in the conveying direction, but are turned by 180°, i.e. the front edge of the articles approaching the reversion arrangement becomes the rear edge when leaving the arrangement.

Figure 4:
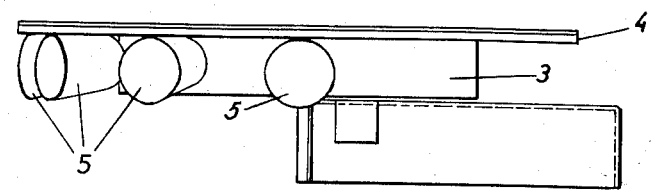

The invention will now be described in particular with reference to FIGS. 1-4 of the accompanying drawings, in which FIG. 1 is an elevational view of the inventive arrangement, FIG. 2 is a side view of the arrangement according to FIG. 1, FIG. 3 is a plan view and shows a further embodiment of the invention for turning the dispatch articles by 180° round an axis extending vertically in relation to the larger surface of the articles, and FIG. 4 shows a top view of the embodiment according to FIG. 3.

In FIG. 1 reference numeral 1 represents a dispatch article, e.g. a letter, which is to be redirected from a horizontal into a vertical conveying direction, e.g. into a drop shaft. First of all the letter is conveyed in the horizontal direction by travelling standing upright on the conveyor belt 2. The conveyor belt 2 is led at the end of its section over a roller 3 which has a substantially larger diameter than would be necessary for a reversing roller. At an angle of 90° in relation to the delivering conveyor belt, the belt 2 leaves the roller 3, returns via the roller 6 to the roller 3 and finally via a roller 7 it extends oppositely to the original direction. The large roller 3 comprises a flange 4 against which two conical rollers 5 are pressed by the force of a spinning, as shown in FIG. 3. Their axes extend radially in relation to the roller 3 and are staggered by about 30° with respect to each other. The item conveyed on belt 2 is seized by the first roller 5 after the belt enters the circular arc around roller 3, and is transferred by this roller to the second roller 5a. In this way it performs a change of direction by about 90°. After leaving the belt 2 at the roller 6 the dispatch article 1 slides into a drop shaft. This drop shaft is limited on the one side by a wall 8. At about the height of the plane in which the dispatch articles are delivered, this wall 8 is provided with an edge which serves to reverse those longitudinal dispatch articles which have erroneously been conveyed on the narrow edge on belt 2, in such a way that it is caused to drop into the drop shaft with one narrow side ahead.

The arrangement according to the invention can also be used for dispatch articles which are conveyed in a flat-lying position. If the conveying sections contacting one another, have different widths, then the narrower conveying section is decisive for the width of the flange. In this case the conveyor belts are led close to the flange, so that the dispatch article can easily change over from the delivering belt to the take-off belt.

FIG. 2 shows the side view of the embodiment according to FIG. 1. In this drawing the flange 4, one of the rollers 5, the belt 2 and the roller 6 can be seen.

FIG. 3 shows the inventive arrangement for reversing the dispatch articles by 180° around an axis extending vertically in relation to the larger surfaces of the dispatch article. In this case several, for example five, conical rollers 5 are used, which are pivoted individually. After the belt 2 has been led by 180° round the large roller 3, it is again deflected by 180° via two rollers 6a and 6b in the opposite direction, so that it now travels in the same direction as before meeting on to the roller 3. From here, for example, the belt 2 is led via a further not shown section to any suitable receiving device, and is led back from there via the rollers 6c and 6d to its starting point. It will be seen that the dispatch article 1, after having been discharged from the last roller 5, drops on to the belt 2 which is moved off underneath, and thereby changes its direction. The front edge of the item just delivered near which a postage stamp can be seen, is now lying opposite the direction of conveyance. Conveying systems for effecting such a reversal of the dispatch articles are necessary, for example, in letter-facing systems in which via optico-mechanical means, the mail items are separated in accordance with the position of the postage stamp, and are supposed to be later guided to a common receiving device via reversing arrangements. Although reversing operations by 180° around an axis extending in the longitudinal direction of the dispatch article can be performed in a relatively simple manner, the reversal around an axis extending vertically in relation to the larger surface of the dispatch article, that is, in relation to the flat side of the letter, is entailed by certain difficulties. However, it has proved that the arrangement according to the invention operates unobjectionably, and is capable of achieving an efficiency of 10–20 items per second.

For reversing the dispatch articles it is necessary that the distance of the plane of the delivering conveyor belt from the periphery of the roller 3, or from the bottom edge of the last conical roller 5 is larger than the height of the largest dispatch article which is likely to be conveyed. It may be appropriate to arrange a guide sheet 9 immediately in front of the rollers 6a and 6b, and to provide a flat spring 10 directly above the delivering belt, leading past the guide sheet 9, whereby the flat spring is adapted to prevent the impact upon the belt of the dispatch article sliding downwards. This flat spring absorbs the impact of the rear edge of the letter, while the front edge comes to lie directly on the belt.

Besides the functional or operational advantages of the inventive arrangement, in particular when conveying articles of different dimensions and weight, this arrangement still bears the added advantage of having the most simple construction. The roller 3, which is necessary for performing the corner reversal is driven in the case of dispatch articles which are conveyed in the standing-up position, by the delivering conveyor belt 2, so that a special driving system for this roller is not required. As shown in FIG. 3 each roller 5 turns on a shaft 11 which is aligned radially with the center of rotation of roller 3. Each shaft is journaled in a yoke 12 which serves to support the shaft 11 and roller 5. The yoke 12 is part of a spring assembly 13 which is mounted on a stationary frame which may be the same frame on which roller 3 is mounted. The spring assembly 13 consists of a spindle 14 which is bolted to the supporting frame, a coil spring 15 slideably mounted over the spindle 14 and restrained at one end by the spindle, the yoke 12 and a fastener 16 to retain the yoke and spring on the spindle. One end of the spring 15 engages the yoke 12 and is adjusted to apply a torque to the yoke 12 about the spindle 14. The torque is transmitted to the roller 5 and serves to urge roller 5 against the flange 4. The roller 5 turns freely on its shaft 11, the friction contact between the roller surface and the flange 5 or the conveyed articles being sufficient to cause the roller to rotate. It has proved particularly suitable to mount the bearings of the rollers on one common support, which is pressed against the flange by the action of a spring, and which is capable of being hinged or swivelled around the centre between the two bearings.

While I have described above the principles of my invention in connection with specific apparatus, it is to be clearly understood that this description is made only by way of example and not as a limitation to the scope of my invention as set forth in the objects thereof and in the accompanying claims.

What is claimed is:
1. In a conveying system which conveys flat articles in an upright position, apparatus to change the direction of motion of the conveyed articles comprising a conveyor belt for conveying articles, a turning roller driven by said belt in passing around said roller, a flange connected to said turning roller, and means which coact with said flange to engage the conveyed articles during a portion of the rotational travel of said turning roller whereby the direction of motion of the conveyed articles is changed.

2. In a conveying system which conveys flat articles in an upright position, apparatus to change the direction of motion of the conveyed articles comprising a conveyor belt for conveying articles, a turning roller driven by said belt in passing around said roller, a flange connected to said turning roller, a plurality of conical rollers mounted adjacent to said flange and yieldably engaging said flange whereby articles conveyed by said conveyor toward said turning roller are engaged between said flange and said conical rollers and change the direction of their motion.

3. Apparatus as in claim 2 wherein said conical rollers are mounted with their axes of rotation extending radially through the center of rotation of said turning roller.

4. Apparatus as in claim 2 wherein said conical rollers are spaced 30° apart about the axis of rotation of said turning roller.

5. Apparatus as in claim 3 wherein two said conical rollers are employed.

6. In a conveying system which conveys flat articles in an upright position, apparatus to change the direction of motion of the conveyed articles comprising a conveyor belt for conveying articles, a turning roller driven by said belt in passing around said roller, a flange connected to said turning roller, a plurality of conical rollers mounted adjacent said flange, a flexible member coupled to each said conical roller and yieldably urging said conical roller into engagement with said turning roller whereby articles conveyed by said conveyor toward said turning roller are engaged between said flange and said conical rollers and change the direction of their motion.

7. Apparatus as in claim 6 wherein the extension of said flange from said turning roller is equal to one fourth of the width of the articles to be turned.

8. Apparatus as in claim 7 wherein said conical rollers are coetxensive with said flange.

9. In a conveying system which conveys flat articles in an upright position, apparatus to control the discharge of the articles from a horizontal direction into a gravity chute comprising a conveyor belt for conveying articles, a turning roller driven by said belt in passing around said roller, a flange connected to said turning roller, a plurality of conical rollers mounted adjacent said flange and yieldably engaging said flange, and a guide wall mounted adjacent said turning roller and parallel to the axis of rotation of said turning roller whereby rectangular articles which are longer than the width of said guide chute and which are conveyed on their narrow edge by said belt engage said wall and are turned in such a way that they will enter the gravity chute narrow edge first.

10. Apparatus as in claim 9 further comprising an idler roller mounted adjacent said turning roller and over which said conveyor belt passes whereby said conveyor belt serves to further guide the conveyed articles into said gravity chute.

11. A letter facing system comprising means to convey letters, a turning roller driven by said conveying means, a flange connected to said turning roller and means which coact with said flange to engage the letters during a portion of the rotational travel of said turning roller whereby the facing of said letters is changed.

12. A letter facing system comprising a conveyor belt for conveying letters, a turning roller driven by said belt in engaging the surface of said roller, a first idler roller mounted adjacent said turning roller and serving to change the direction of said belt as said belt passes thereover, a second idler roller mounted a predetermined distance from said first idler roller and serving to change the direction of said belt as said belt passes thereover whereby the final direction of motion of said belt is parallel to the direction of motion of said belt before engaging said turning roller, a flange connected to said turning roller, a plurality of conical rollers mounted adjacent said flange and yieldably engaging said flange whereby letters which are conveyed to said turning roller by said belt are engaged by said rollers and flange and are inverted and discharged back onto said belt conveyor.

13. A letter facing system as in claim 12 wherein said predetermined distance between said first and second idler rollers is greater than the width of the longest letter to be faced.

14. A letter facing system as in claim 13 further comprising a guide sheet mounted adjacent said turning roller so as to limit the travel of the faced article around said turning roller.

15. A letter facing system as in claim 14 further comprising a flat spring mounted adjacent said guide sheet and said belt whereby the impact of the rear edge of said faced letter is absorbed by said spring and the front edge of said article directly engages said belt.

References Cited in the file of this patent

UNITED STATES PATENTS

| | | |
|---|---|---|
| 2,719,629 | Robinson | Oct. 4, 1955 |
| 2,822,171 | Luning | Feb. 4, 1958 |

FOREIGN PATENTS

| | | |
|---|---|---|
| 530,362 | Germany | July 28, 1931 |
| 895,876 | Germany | Nov. 5, 1953 |